United States Patent
Farah et al.

(10) Patent No.: US 9,393,637 B2
(45) Date of Patent: Jul. 19, 2016

(54) BRUSH MAINTENANCE SYSTEM FOR ENGINE DRIVEN WELDER

(71) Applicant: LINCOLN GLOBAL, INC., City of Industry, CA (US)

(72) Inventors: Samir F. Farah, Broadview Heights, OH (US); Adam Hruska, Chardon, OH (US); Joseph Hrusovsky, Concord, OH (US)

(73) Assignee: Lincoln Global, Inc., City of Industry, CA (US)

( * ) Notice: Subject to any disclaimer, the term of this patent is extended or adjusted under 35 U.S.C. 154(b) by 78 days.

(21) Appl. No.: 14/091,685

(22) Filed: Nov. 27, 2013

(65) Prior Publication Data

US 2015/0070183 A1 Mar. 12, 2015

Related U.S. Application Data

(60) Provisional application No. 61/876,803, filed on Sep. 12, 2013.

(51) Int. Cl.
*G08B 21/00* (2006.01)
*B23K 9/10* (2006.01)

(52) U.S. Cl.
CPC .................................. *B23K 9/1006* (2013.01)

(58) Field of Classification Search
CPC ......................... G08B 21/182; G05B 19/4065
USPC ............................ 340/648, 680; 219/130, 137
See application file for complete search history.

(56) References Cited

U.S. PATENT DOCUMENTS

| | | | |
|---|---|---|---|
| 4,333,095 A * | 6/1982 | Silva | 340/679 |
| 4,636,778 A | 1/1987 | Corkran et al. | |
| 4,918,348 A | 4/1990 | Fitzimmons et al. | |
| 5,870,026 A | 2/1999 | Challenger | |
| 6,124,567 A * | 9/2000 | Feldhausen et al. | 219/130.1 |
| 6,362,629 B1 | 3/2002 | Parker et al. | |
| 6,747,459 B2 | 6/2004 | Parker et al. | |
| 6,982,398 B2 * | 1/2006 | Albrecht | 219/133 |
| 7,244,106 B2 | 7/2007 | Kallman et al. | |
| 7,358,458 B2 | 4/2008 | Daniel | |
| 7,936,105 B2 * | 5/2011 | Martin et al. | 310/248 |
| 8,080,761 B2 * | 12/2011 | Matthews et al. | 219/130.1 |
| 8,461,483 B2 * | 6/2013 | Farah et al. | 219/130.1 |
| 8,618,943 B2 * | 12/2013 | Cutsforth | H01R 39/58 340/635 |
| 2005/0104616 A1 * | 5/2005 | Cullen et al. | 324/772 |
| 2005/0237011 A1 * | 10/2005 | Woods et al. | 318/53 |
| 2011/0006717 A1 * | 1/2011 | Kyrtsos et al. | 318/490 |
| 2011/0017717 A1 * | 1/2011 | Farah et al. | 219/133 |
| 2012/0061959 A1 * | 3/2012 | Yasugi et al. | 290/44 |
| 2013/0179104 A1 * | 7/2013 | Howell et al. | 702/64 |

FOREIGN PATENT DOCUMENTS

CA 1332076 9/1994

* cited by examiner

*Primary Examiner* — Hai Phan
*Assistant Examiner* — Royit Yu
(74) *Attorney, Agent, or Firm* — Hahn Loeser & Parks LLP

(57) ABSTRACT

The invention described herein generally pertains to a system and method for monitoring a brush of a rotor/stator assembly associated with an engine driven welder. A notification system can be provided that outputs alerts related to an amount of wear on a brush in contact with a rotor/stator assembly. An in situ component can provide dynamic real time monitoring of the brush and in particular an amount of wear of the brush. Based on a predetermined amount of wear being met, a notification component can output an alert.

5 Claims, 10 Drawing Sheets

BRUSH MAINTENANCE SYSTEM FOR ENGINE DRIVEN WELDER

CROSS-REFERENCE TO RELATED APPLICATIONS

This application claims the benefit of priority to U.S. Provisional Application Ser. No. 61/876,803, filed Sep. 12, 2013, and entitled "BRUSH MAINTENANCE SYSTEM FOR ENGINE DRIVEN WELDER." The entirety of the aforementioned application is incorporated herein by reference.

TECHNICAL FIELD

The invention described herein pertains generally to a system and method that indicates an amount of wear on a brush in contact with a portion of a rotor/stator assembly in an engine driven welding device.

BACKGROUND OF THE INVENTION

Frequently, welding is required where supply power may not be readily available. As such, the welding power supply may be an engine driven welding power supply incorporating a generator. The generator may supply power to the welder as well as to other power tools as may be needed on site. As different applications require different versions of welders and power tools, the trailer may be designed to carry one of many different types of welding power supplies.

Traditional welding-type apparatus can be broken into two basic categories. The first category receives operational power from transmission power receptacles, also known as static power. The second is portable or self-sufficient, stand alone welders having internal combustion engines, also known as rotating power. While in many settings conventional static power driven welders are preferred, engine driven welders enable welding-type processes where static power is not available. Rotating power driven welders operate by utilizing power generated from engine operation. As such, engine driven welders and welding-type apparatus allow portability and thus fill an important need.

Static powered welders initiate the weld process by way of a trigger on a hand-held torch or with an electrically charged stick connected to a charged electrode.

Rotating power driven welders operate similarly, as long as the engine is running. If the engine is shut down, there is typically no residual power to create an arc. To once again weld, the engine must be started and run at operational speed to produce the arc. Therefore, it is simply not possible to manually start and stop the engine between each and every break in the welding process. Further, even during longer periods, operators may find it easier to let the engine run because of distance to the engine, a misconception that it is better for the engine, or just out of habit. Moreover, engine driven welding devices have many moving mechanical parts that often require maintenance or servicing to ensure optimal performance.

SUMMARY OF THE INVENTION

In accordance with the present invention, there is provided a welding device that includes a motor-driven welder assembly including an engine that is configured to rotate a shaft and a rotor having at least one electromagnet, the rotor is coupled to the shaft. The welding device can include a stator, having at least one electromagnet, that houses the rotor, wherein a rotation from the shaft rotates the rotor to generate a portion of electrical current and the portion of electrical current is used as a power source for the welding device to perform a welding operation. The welding device can include a brush that contacts a commutator, wherein the commutator is coupled to an axle of the rotor. The welding device can further include an in situ component that dynamically monitors a wear of the brush and a notification component that delivers an alert based upon the wear of the brush.

In accordance with the present invention, there is provided a engine welding system that includes at the least the following: an engine that rotates a shaft coupled to a rotor/stator assembly; a brush in contact with a portion of the rotor/stator assembly; a member that is in contact with the brush parallel with a direction of wear of the brush; and a controller that activates a notification based on the member coming in physical contact with the rotor/stator assembly.

In accordance with the present invention, there is provided a method that includes at least the following steps: rotating a shaft coupled to a rotor to generate a portion of electrical power; performing a welding operation with the portion of electrical power; monitoring an amount of wear on a brush in contact with a rotor/stator assembly that includes the rotor; and generating a notification based on the amount of wear on the brush.

In accordance with the present invention, there is provided a welding system that includes at least the following: a housing that encloses an engine that rotates a shaft coupled to a rotor/stator assembly; a brush assembly that houses a first brush and a second brush that are in contract with a portion of the rotor/stator assembly; a spring coupled to the brush assembly that forces the first brush and the second brush in contact with the portion of the rotor/stator assembly; a transparent portion on a housing of the welding system; an indicator affixed to the brush assembly, wherein the indicator is visible through the transparent portion on the housing; and the indicator depicts visual indication of the wear of the first brush and the second brush on a gauge.

These and other objects of this invention will be evident when viewed in light of the drawings, detailed description and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION OF THE INVENTION

Embodiments of the invention relate to methods and systems that generally relate to an engine driven welding device and in particular to a notification system that outputs alerts related to an amount of wear on a brush used with a rotor/stator assembly. The brush is in contact with a rotor/stator assembly and can be worn based on the physical contact thereof. An in situ component can provide dynamic real time monitoring of the brush and in particular an amount of wear of the brush. Based on a predetermined amount of wear being met, a notification component can output an alert (e.g., audio, visual, haptic, or a combination thereof).

The subject innovation can be used with any suitable engine-driven welder, engine-driven welding system, engine-driven welding apparatus, a welding system powered by an engine, a welding system powered by a battery, a welding system powered by an energy storage device, a hybrid welder (e.g., a welding device that includes an engine driven power source and an energy storage device or batter), or a combination thereof. It is to be appreciated that any suitable system, device, or apparatus that can perform a welding operation can be used with the subject innovation and such can be chosen with sound engineering judgment without departing from the intended scope of coverage of the embodiments of the subject invention. The engine driven welder can include a power source that can be used in a variety of applications where outlet power is not available or when outlet power will not be relied on as the sole source of power including portable power generation, backup power generation, heating, plasma cutting, welding, and gouging. The example discussed herein relates to welding operations, such as, arc welding, plasma cutting, and gouging operations. It is to be appreciated that a power source can generate a portion of power, wherein the portion of power is electrical power. It is to be appreciated that "power source" as used herein can be a motor, an engine, a generator, an energy storage device, a battery, a component that creates electrical power, a component that converts electrical power, or a combination thereof. Moreover, a component can be a portion of software, a portion of hardware, or a combination thereof. By way of example and not limitation, FIGS. 1-4 illustrate welding systems or devices that can be utilized with the subject innovation. It is to be appreciated that the following welding systems are described for exemplary purposes only and are not limiting on the welding systems that can utilize the subject innovation or variations thereof.

Figure 1:
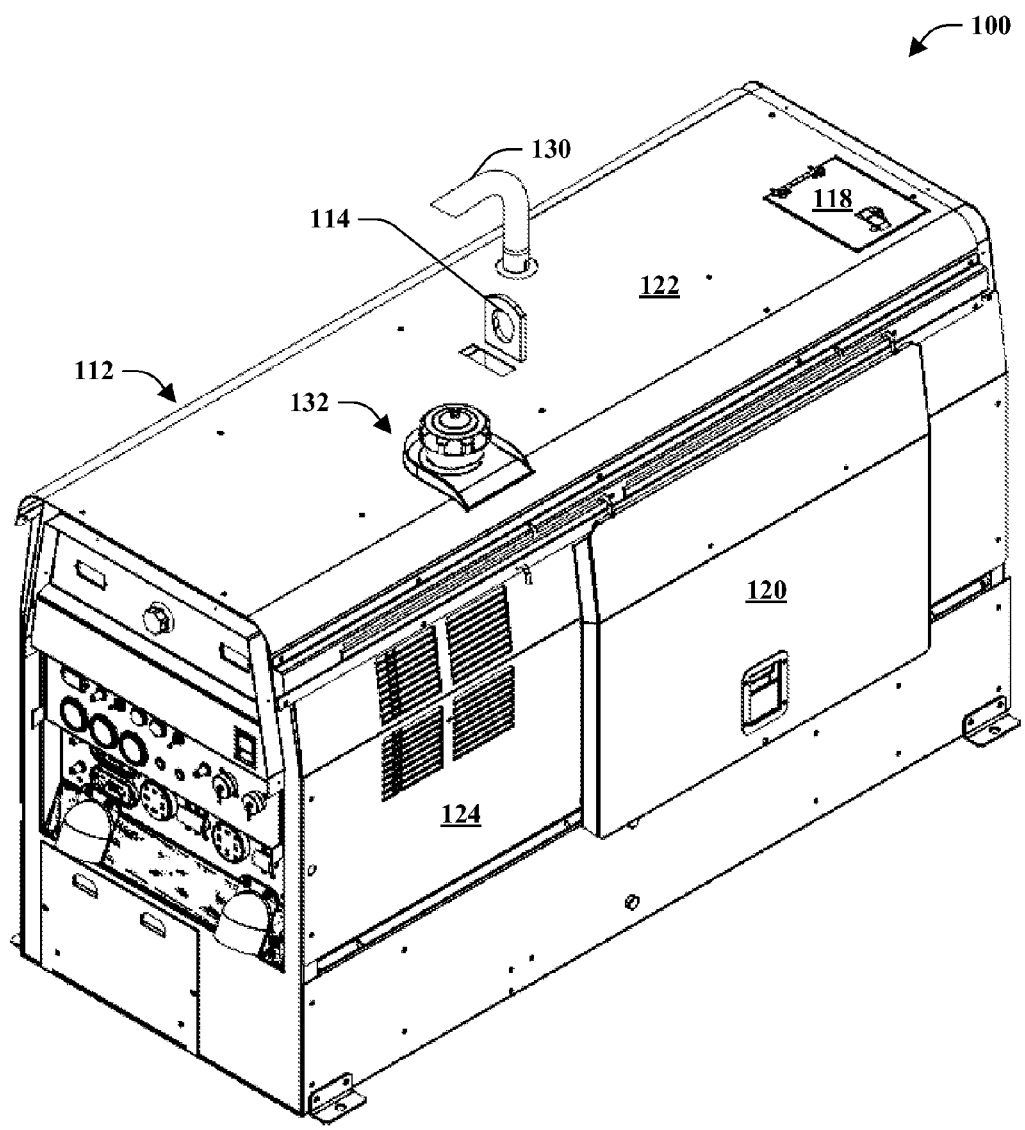
FIG. 1 is a block diagram illustrating a welding device that includes a motor as a power source.

FIG. 1 illustrates a welding device 100. The welding device 100 includes a housing 112 which encloses the internal components of the welding device. Optionally, the welding type device 100 includes a loading eyehook 114 and/or fork recesses. The loading eyehook 114 and the fork recesses facilitate the portability of the welding device 100. Optionally, the welding-type device 100 could include a handle and/or wheels as a means of device mobility. The housing 112 also includes a plurality of access panels 118, 120. Access panel 118 provides access to a top panel 122 of housing 112 while access panel 120 provides access to a side panel 124 of housing 112. A similar access panel is available on an opposite side. These access panels 118, 120, provide access to the internal components of the welding device 100 including, for example, an energy storage device (not shown) suitable for providing welding-type power. An end panel includes a louvered opening to allow for air flow through the housing 112.

The housing 112 of the welding-type device 100 also houses an internal combustion engine. The engine is evidenced by an exhaust port 130 and a fuel port 132 that protrude through the housing 112. The exhaust port 130 extends above the top panel 122 of the housing 112 and directs exhaust emissions away from the welding-type device 100. The fuel port 132 preferably does not extend beyond the top panel 122 or side panel 124. Such a construction protects the fuel port 132 from damage during transportation and operation of the welding-type device 100.

Figure 2:
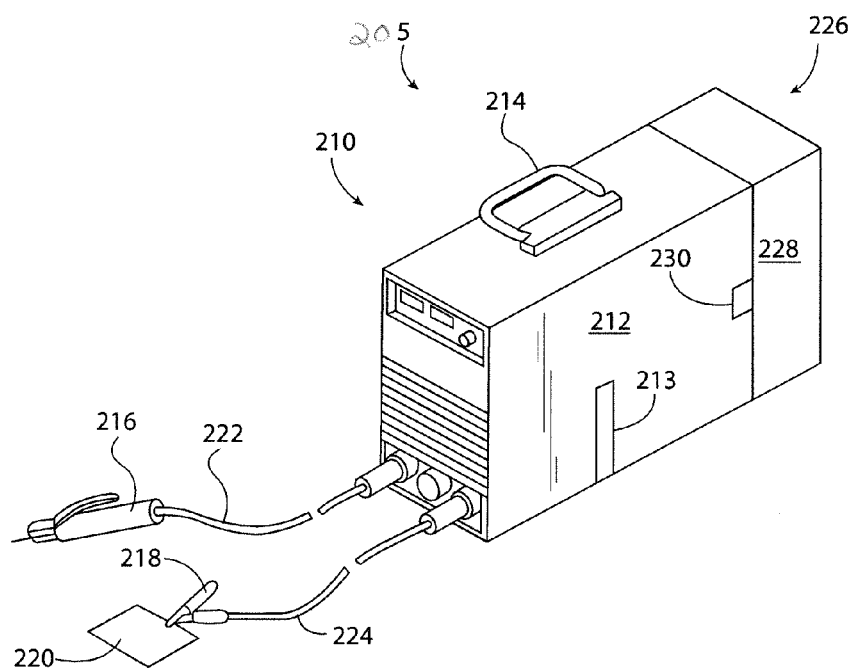
FIG. 2 is a block diagram illustrating a welding device.

Referring now to FIG. 2, a perspective view of a welding apparatus 205 that can be utilized with the subject innovation. Welding apparatus 205 includes a power source 210 that includes a housing 212 enclosing the internal components of power source 210. As will be described in greater detail below, housing 212 encloses control components 213. Optionally, welding device 205 includes a handle 214 for transporting the welding system from one location to another. To effectuate the welding process, welding device 205 includes a torch 216 as well as a grounding clamp 218. Grounding clamp 218 is configured to ground a workpiece 220 to be welded. As is known, when torch 216 is in relative proximity to workpiece 220, a welding arc or cutting arc, depending upon the particular welding-type device, is produced. Connecting torch 216 and grounding clamp 218 to housing 212 is a pair of cables 222 and 224, respectively.

The welding arc or cutting arc is generated by the power source by conditioning raw power received from an interchangeable energy storage device 226. In a preferred embodiment, energy storage device 226 is a battery. Energy storage device 226 is interchangeable with similarly configured batteries. Specifically, energy storage device 226 is encased in a housing 228. Housing 228 is securable to the housing of welding device 210 thereby forming welding-type apparatus 205. Specifically, energy storage device 226 is secured to power source 210 by way of a fastening means 230. It is contemplated that fastening means 230 may include a clip, locking tab, or other means to allow energy storage device 226 to be repeatedly secured and released from power source 210.

Figure 3:
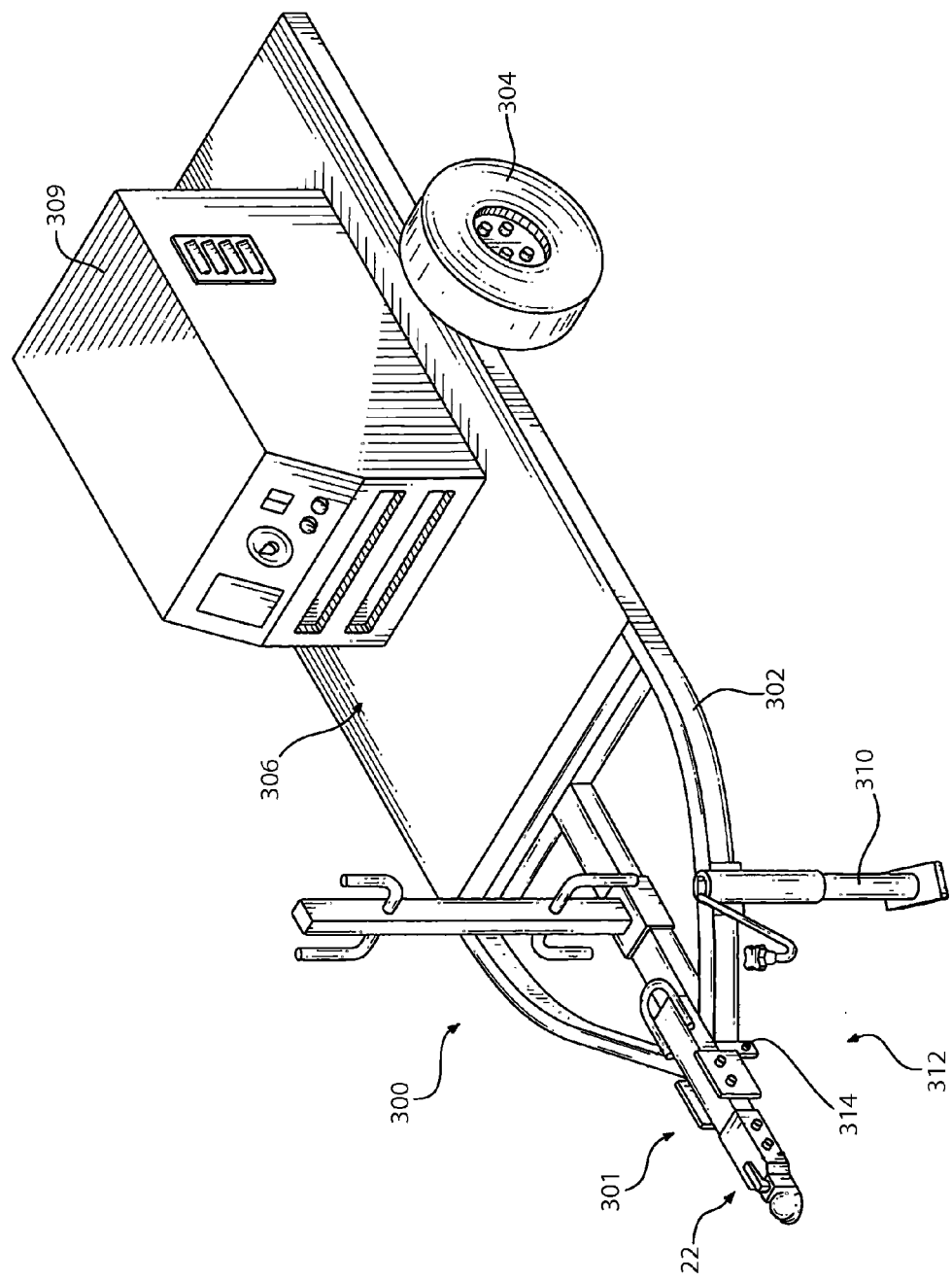
FIG. 3 is a block diagram illustrating a welding device affixed to a trailer for mobility.

FIG. 3 illustrates a trailer 300 incorporating a trailer hitch or hitching device, depicted generally at 301. The trailer 300 may include a trailer frame 302 and one or more trailer wheels 304 in rotational connection with the trailer frame 302 and may further include a payload region 306 for carrying one or more cargo items, which in an exemplary manner may be a welding power supply 309 or an engine driven welding power supply 309. The trailer 300 may also include an adjustable stand 310 for adjusting the height of the front end 312 of the trailer 300. However, any means may be used for raising and/or lowering the front end 312 of the trailer 300. The trailer hitch 301 may be a generally longitudinal and substantially rigid trailer hitch 301 and may be attached to the frame 302 via fasteners 314, which may be threaded bolts.

Figure 4A:
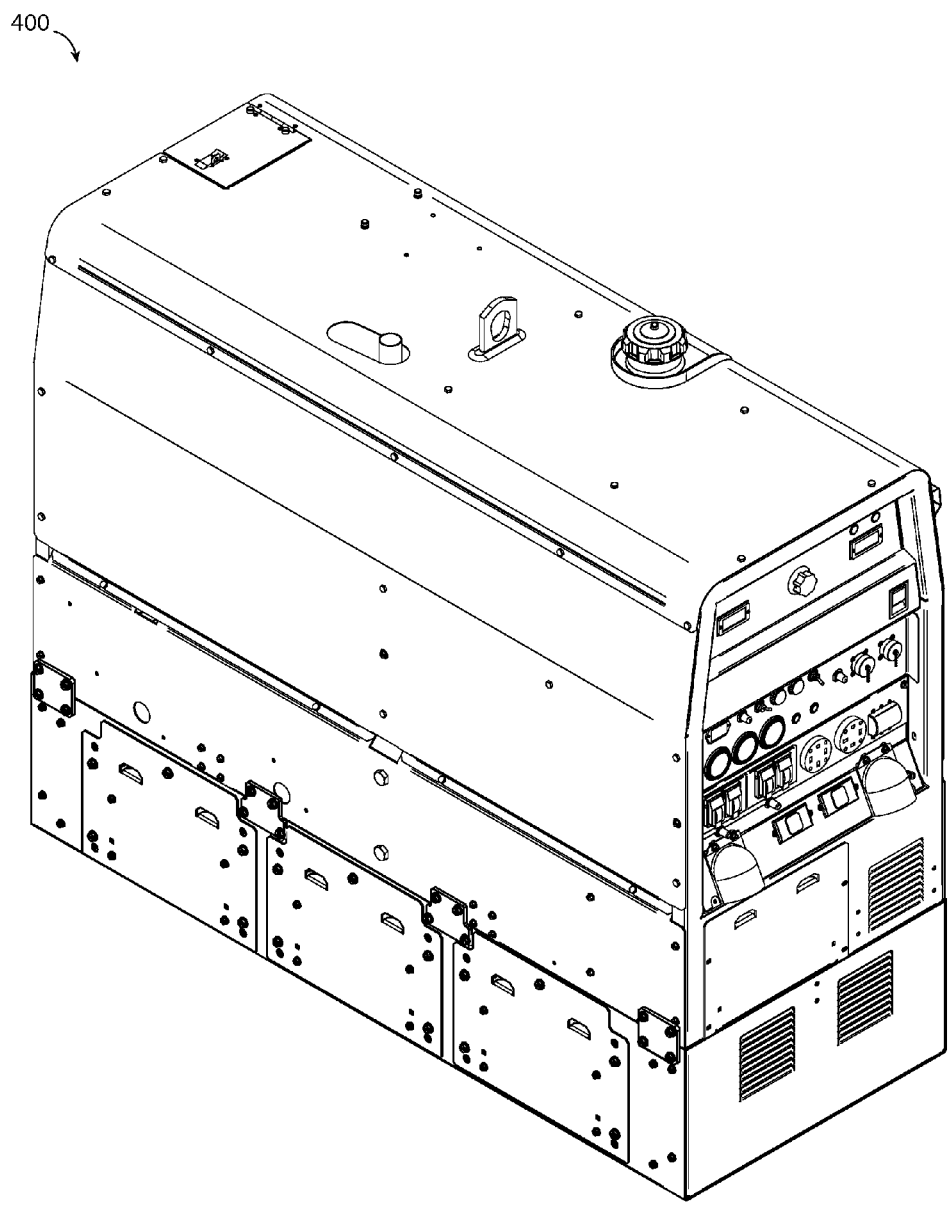
FIG. 4A is a block diagram illustrating a welding device.
Figure 4B:
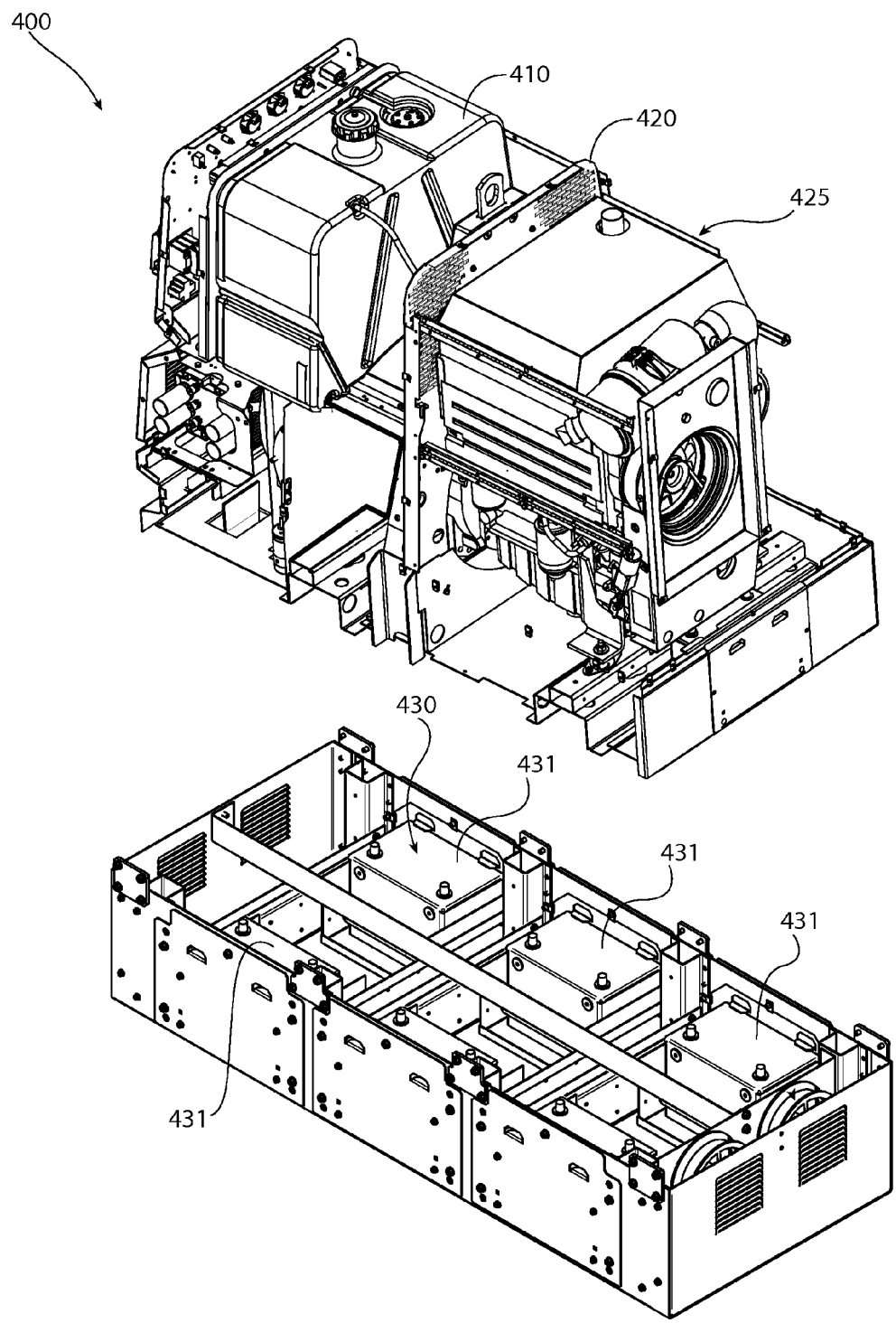
FIG. 4B is a block diagram illustrating a welding device.

FIGS. 4A and 4B illustrate a hybrid welding device (herein referred to as a "hybrid welder"). A hybrid welder according to the invention is generally indicated by the number 400 in the drawings. Hybrid welder 400 includes an engine component that runs on fuel from fuel storage 410 allowing the hybrid welder 400 to be portable. It will be appreciated that hybrid welder 400 may also be mounted in a permanent location depending on the application. Hybrid welder 400 generally includes a motor-driven welder assembly 420 having a motor 425 and an energy storage device 430. Motor 425 may be an internal combustion engine operating on any known fuel including but not limited to gasoline, diesel, ethanol, natural gas, hydrogen, and the like. These examples are not limiting as other motors or fuels may be used.

The motor 425 and energy storage device 430 may be operated individually or in tandem to provide electricity for the welding operation and any auxiliary operations performed by hybrid welder 400. For example, individual operation may include operating the motor 425 and supplementing the power from the motor 425 with power from the energy storage device 430 on an as needed basis. Or supplying power from the energy storage device 430 alone when the motor 425 is offline. Tandem operation may also include combining power from motor 425 and energy storage device 430 to obtain a desired power output. According to one aspect of the invention, a welder 400 may be provided with a motor having less power output than ordinarily needed, and energy storage device 430 used to supplement the power output to raise it to the desired power output level. In an embodiment, a motor with no more than 19 kW (25 hp) output may be selected and supplemented with six 12 volt batteries. Other combinations of motor output may be used and supplemented with more or less power from energy storage device. The above example, therefore, is not limiting.

Energy storage device 430 may be any alternative power source including a secondary generator, kinetic energy recovery system, or, as shown, one or more batteries 431. In an embodiment, six 12 volt batteries 431 are wired in series to provide power in connection with motor-driven welder assembly 420. Batteries 431 shown are lead acid batteries. Other types of batteries may be used including but not limited to NiCd, molten salt, NiZn, NiMH, Li-ion, gel, dry cell, absorbed glass mat, and the like.

The best mode for carrying out the invention will now be described for the purposes of illustrating the best mode known to the applicant at the time of the filing of this patent application. The examples and figures are illustrative only and not meant to limit the invention, which is measured by the scope and spirit of the claims. Referring now to the drawings, wherein the showings are for the purpose of illustrating an exemplary embodiment of the invention only and not for the purpose of limiting same, FIGS. 5-8 illustrate a schematic block diagram of a welding device, and in particular, an engine driven welding device as discussed in FIGS. 1-4. FIG. 9 illustrates a methodology that can be implemented with one or more welding devices discussed in FIGS. 1-4.

Figure 5:
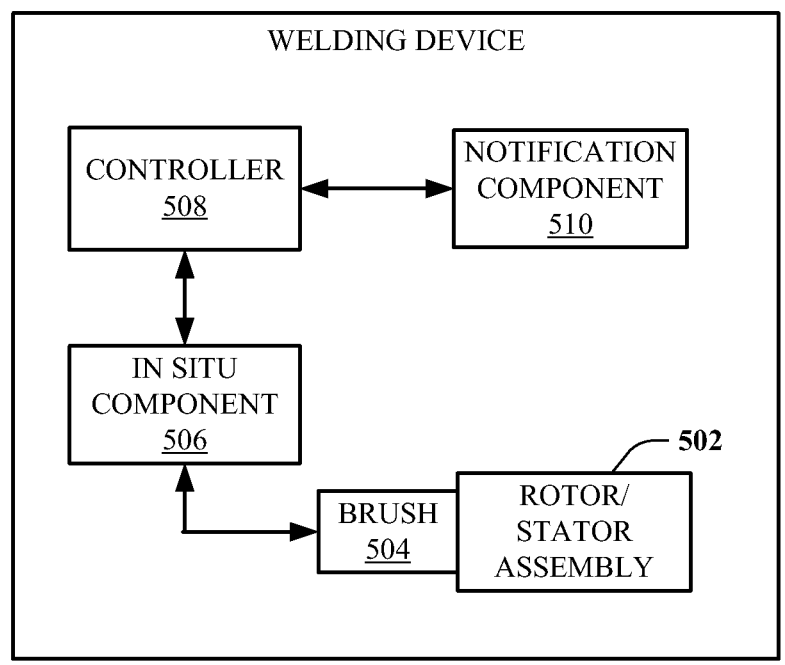
FIG. 5 is a block diagram illustrating welding device that outputs an alert based on an amount of wear of a brush associated with a rotor/stator assembly.

FIG. 5 illustrates welding device 500 that provides in situ dynamic monitoring of brush 504 utilized with rotor/stator assembly 502. Rotor/stator assembly 502 generates a portion of electrical current based on a rotation of a rotor housed within a stator. Rotor/stator assembly 502 includes at least one brush 504 that is in physical contact with at least a portion of rotor/stator assembly 502. In particular, brush 504 is in contact with a commutator (not shown), wherein the commutator is coupled to an axle of the rotor of the rotor/stator assembly 502.

As rotor/stator assembly 502 operates, brush 504 is in contact therewith and can wear down over time and/or revolutions. In situ component 506 provides dynamic monitoring of brush 504 and, in particular, an amount of wear of brush 504 from being in physical contact with rotor/stator assembly 502. Welding device 500 further includes controller 508 that is configured to manage at least one of in situ component 506 or notification component 510. In particular, controller 508 can collect data from in situ component 506 from which control of notification component 510 is based.

For instance, controller 508 can include a predetermined amount of wear that is to be detected by in situ component 506. Once the predetermined amount of wear is detected, notification component 510 can output an alert based on instructions (e.g., electric signal, bit logic, etc.) from controller 508. Controller 508 can be programmed with one or more instruction to control brush monitoring with at least in situ component 506 or notification component 510. In an embodiment, controller 508 can receive a data signal from in situ component 506 for determination or evaluation of whether a predetermined amount of wear is met. In another example, controller 508 can dynamically calculate an amount of wear for brush 504 which can trigger an output from notification component 510.

By way of example and not limitation, controller 508 can calculate a resistance level for brush 504 while rotor/stator assembly 502 is operating. This resistance level can be collected on a periodic basis from which controller 508 uses to estimate an amount of wear of brush 504. Based on the estimated amount of wear (via controller 508) of brush 504, notification component 510 generates an output (e.g., alert) to indicate brush 504 is worn and requires at least one of repair, maintenance, or replacement.

Welding device 500 can further include notification component 510 can output an alert based on whether brush 504 is worn, wherein an amount of wear is predetermined, dynamically determined, or a combination thereof. Notification component 510 can output the alert based on at least one of controller 508, in situ component 506, or a combination thereof. By way of example and not limitation, the alert can be a visual indicator, a haptic indicator, an audible indicator, or a combination thereof. For instance, the alert can be an output to indicate brush 504 is worn, met an amount of wear, exceeded an amount of wear, or is approaching an amount of wear. In particular, the alert can be a sound, an alarm, a displayed alert, a portion of text, a letter, a number, a color, a vibration, a light (e.g., Light Emitting Diode (LED), bulb, and the like), a graphic on a display (e.g., monitor, tablet, smartphone, computing device, and the like), or a combination thereof. By way of example and not limitation, the alert can be an indicator light and an alarm sound effect.

In an embodiment, notification component 510 can output the alert such that a user working with welding device 500 is notified about an amount of wear on brush 504 without difficulty (e.g., opening an access panel, manual examination of brush 504, etc.). For example, the alert can be a light that can be displayed inside a housing of welding device 500 or outside the housing. By way of example, a light can be illuminated upon a predetermined amount of wear of brush 504 such that the light is located on a control panel on an exterior of a housing of welding device 500. In another example, the light can be located inside the housing of welding device 500 and visible through a transparent portion of the housing. Moreover, it is to be appreciated that an internal and external alert can be utilized with welding device 500. In another example, a housing can include a transparent portion to view a wear of brush 504 (discussed in more detail in FIG. 8B.

In situ component 506 can be a stand-alone component (as depicted), incorporated into brush 504, incorporated into rotor/stator assembly 502, incorporated into controller 508, incorporated into notification component 510, or a combination thereof. Notification component 510 can be a stand-alone component (as depicted), incorporated into brush 504, incorporated into rotor/stator assembly 502, incorporated into controller 508, incorporated into in situ component 506, or a combination thereof. Controller 508 can be a stand-alone component (as depicted), incorporated into brush 504, incorporated into rotor/stator assembly 502, incorporated into in situ component 506, incorporated into notification component 510, or a combination thereof.

Figure 6:
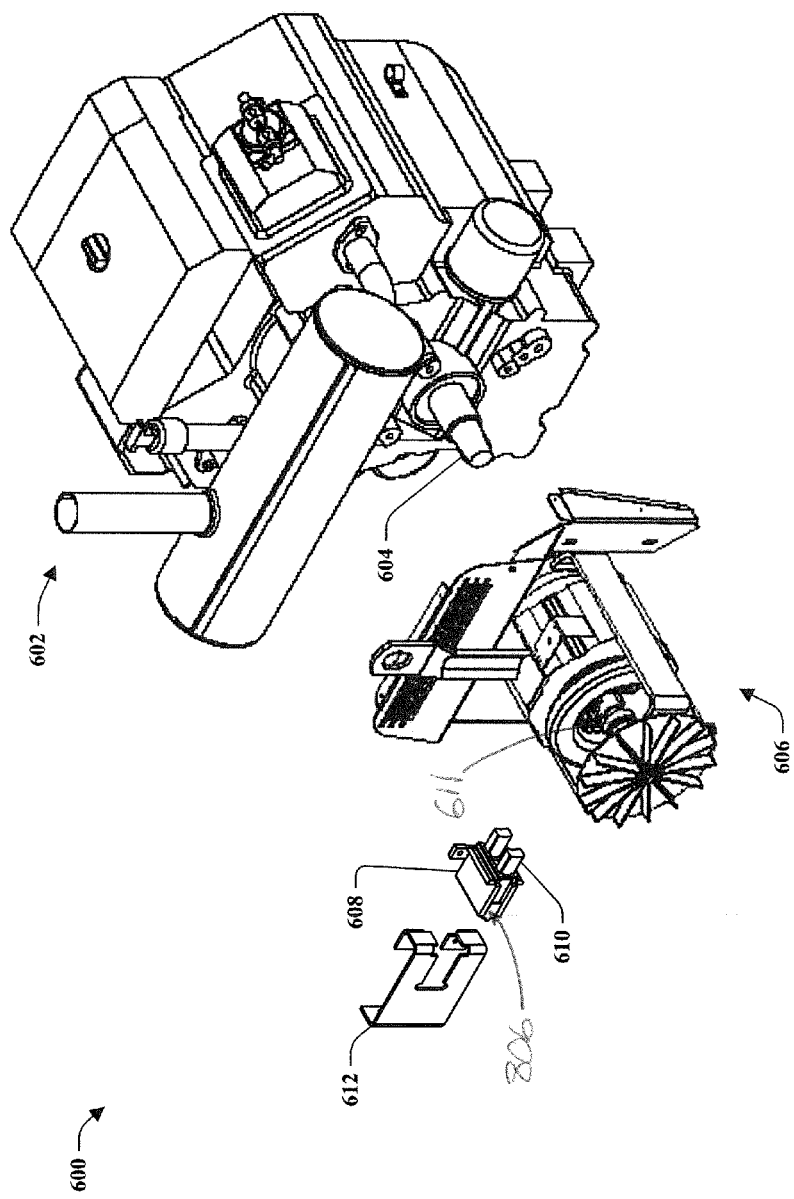
FIG. 6 is a diagram illustrating an engine driven welding system.

FIG. 6 illustrates engine driven welding system 600 that includes engine 602 that actuates shaft 604. In particular, engine 602 provides rotational movement to shaft 604 that is coupled to rotor/stator assembly 606. Rotor/stator assembly 606 includes a rotor that is coupled to shaft 604 for rotational movement and a stator that is stationary. It is to be appreciated that rotor/stator assembly 606 can be chosen with sound engineering judgment without departing from the scope of the subject innovation. For instance, the rotor and the stator of rotor/stator assembly 606 can include one or more electromagnets, wherein the rotor rotates from rotation from shaft 604 and stator is stationary and houses the rotor.

Rotor/stator assembly 606 can include at least one brush 610 that is housed in brush assembly 608 and affixed to a portion of rotor/stator assembly 606 via bracket 612. It is to be appreciated that brush assembly 608 can include at least one of a spring, a clip, a retainer, among others. Brush assembly 608 and bracket 612 can be chosen with sound engineering judgment without departing from the scope of the subject innovation. By way of example, brush assembly 608 is illustrated with a first brush and a second brush, however, it is to be appreciated that any suitable number of brushes can be used with the subject innovation. Brush 610 is in physical contact with at least a portion of rotor/stator assembly 606, wherein bracket 612 places brush 610 within proximity of rotor/stator assembly 606 and a spring 806 provides a force to brush 610 to physically contact rotor/stator assembly 606. In particular, brush 610 can physically contact a commutator (FIG. 8B) that is coupled to an axle 611 of the rotor included with rotor/stator assembly 606.

Figure 7:
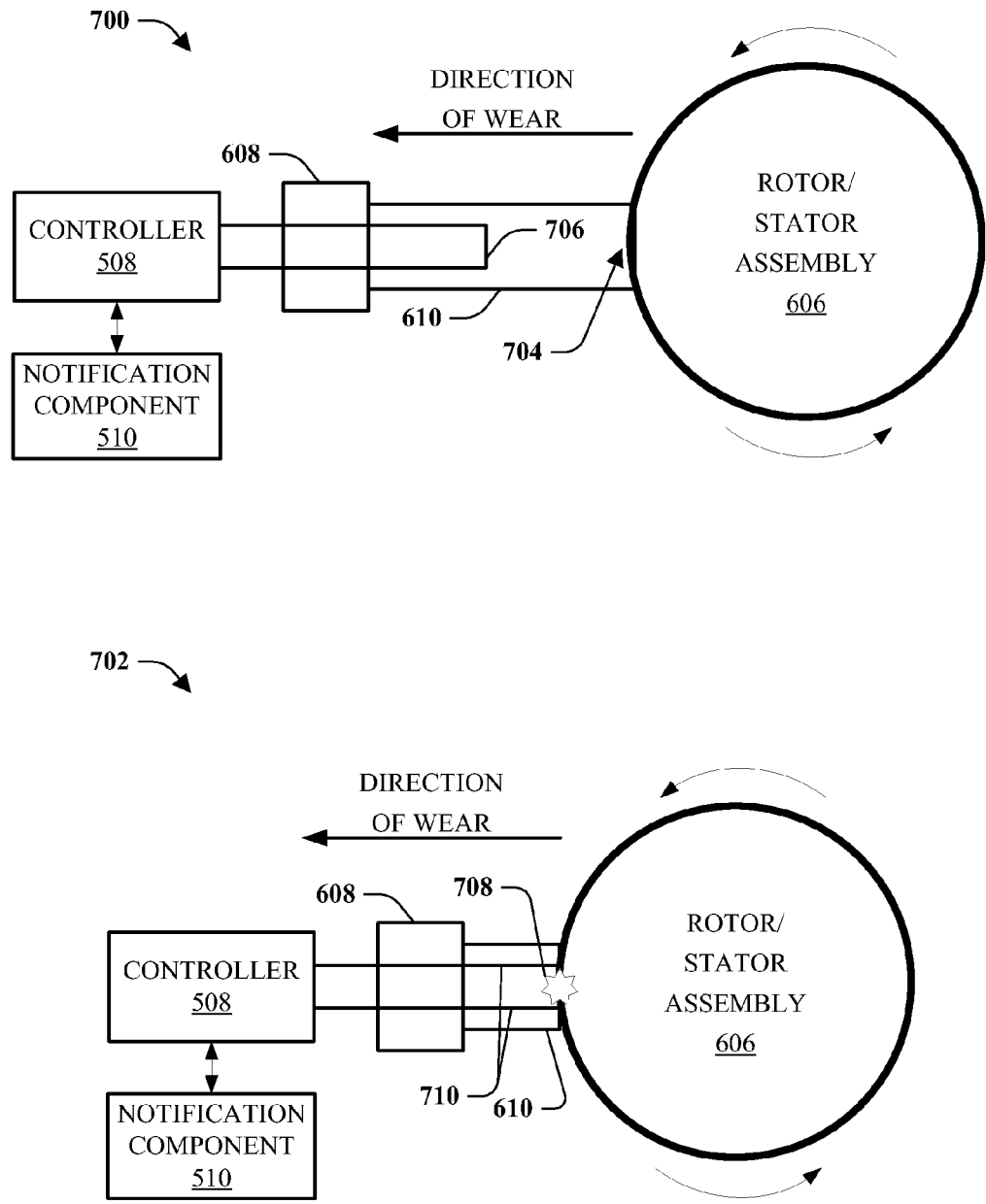
FIG. 7 is a diagram illustrating a rotor/stator assembly with a brush monitoring system.

FIG. 7 illustrates a progression of wear on a brush of a rotor/stator assembly in accordance with the subject innovation. System 700 illustrates an alert output for an amount of wear on a brush based on a termination of a flow of current through electric circuit 706. System 700 includes brush assembly 608 that secures at least one brush 610 that is in physical contact with a portion of rotor/stator assembly 606 at an area 704. It is to be appreciated that over a duration of time when rotor/stator assembly 606 is operating, brush 610 wears at area 704 as illustrated by direction of wear in FIG. 7. Electric circuit 706 can be associated with brush 610 such that a flow of current can have a path from controller 508 through electric circuit 706 back to controller 508. By way of example, electric circuit 706 can be a wire inserted through at least one of brush assembly 608 and brush 610, wherein controller 508 supplies the flow of current to the wire and receives the flow of current back from the wire. As rotor/stator assembly 606 operates with brush 610 in physical contact, brush 610 is worn in a direction indicated by the direction of wear. After an amount of wear, the contact of brush 610 exposes electric circuit 706 to contact with a portion of rotor/stator assembly 606. This contact leads to a break of electric circuit 706 as illustrated in system 702.

System 702 illustrates the alert output for an amount of wear on brush 610 based on the flow of current being terminated since electric circuit 706 is incomplete (illustrated by break 708 in wires 710). As rotor/stator assembly 606 rotates and brush 610 is in physical contact, wear eliminates a length of brush 610 as indicated by direction of wear in FIG. 7. The wear can eventually over time become in contact with electric circuit 706 and break electric circuit 706 as indicated by break 708. Break 708 terminates the flow of current back to controller 508 in which controller uses to activate notification component 510. It is to be appreciated that break 708 is shown in one location but can be in any suitable number of locations so long as a flow of current is terminated and not received by controller 508.

It is to be appreciated that electric circuit 706 can be embedded into brush 610, affixed to an exterior of brush 610, or a combination thereof. By way of example, a wire (e.g., used as part of electric circuit 706) can be affixed in a direction parallel to the direction of wear of brush 610. Such configuration allows the wire to be aligned with the wear of brush 610 as it nears a point of concern (e.g., maintenance required, service required, replacement, etc.).

In another embodiment, circuit 706 can be completed upon a break based on a wear of brush 610. For instance, circuit 706 can include a wire that carries current flow such that a flow of current can be from controller 508 through the wire. Upon being broke based on wear, the flow of current can travel through the wire to and through rotor/stator assembly 606 to an additional wire that carries the flow of current back to controller 508. Based on the break of the wire and completion of circuit 706, notification component 510 can output an alert.

By way of example, electric circuit 706 can be a wire inserted through at least one of brush assembly 608 and brush 610, wherein controller 508 supplies the flow of current to the wire. As rotor/stator assembly 606 operates with brush 610 in physical contact, brush 610 is worn in a direction indicated by the direction of wear. The wear on brush 610 can lead to wear on the wire that exposes the wire to become in contact with rotor/stator assembly. An additional wire can be affixed to rotor/stator assembly and controller 508 that provides an electrical path for the flow of current—starting from controller 508 to the exposed wire, through rotor/stator assembly 606, through the additional wire back to controller 508. In this example, a broken wire (e.g., incomplete electrical circuit 706) indicates a wear on brush 610, wherein an output from notification component 510 can be generated.

In an embodiment, PC board logic can be used in that a lead (e.g., a wire) can be embedded into brush 610 or affixed to brush 610 (parallel to a direction of wear). The lead can be part of an electric circuit that has current flow. During wear of brush 610, the wear can (after time) result in a cutting of the lead. If the lead is broke, notification component 510 can generate an alert since the electric circuit is incomplete (e.g., current flow is terminated). In another embodiment, once the lead is broke, notification component 510 can generate an alert since the electric circuit is complete (e.g., current flow is initiated).

Figure 8A:
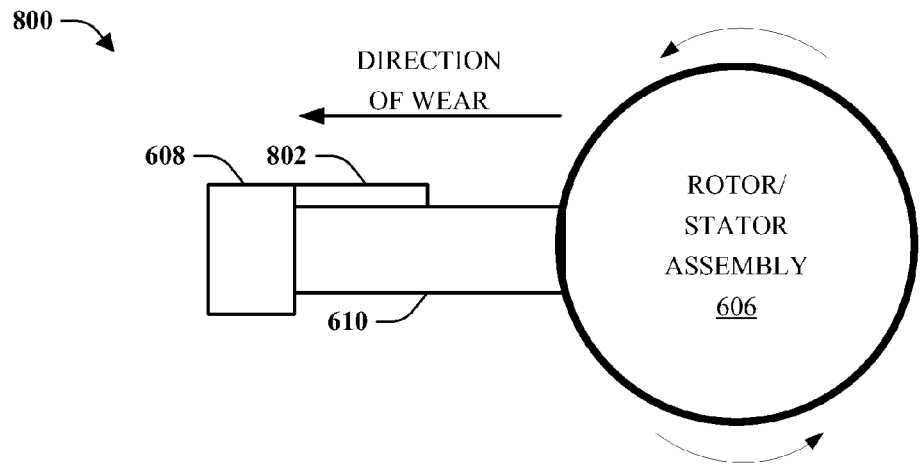
FIG. 8A is a diagram illustrating a rotor/stator assembly with a brush monitoring system that is can be retrofitted to an engine driven welder.
Figure 9:
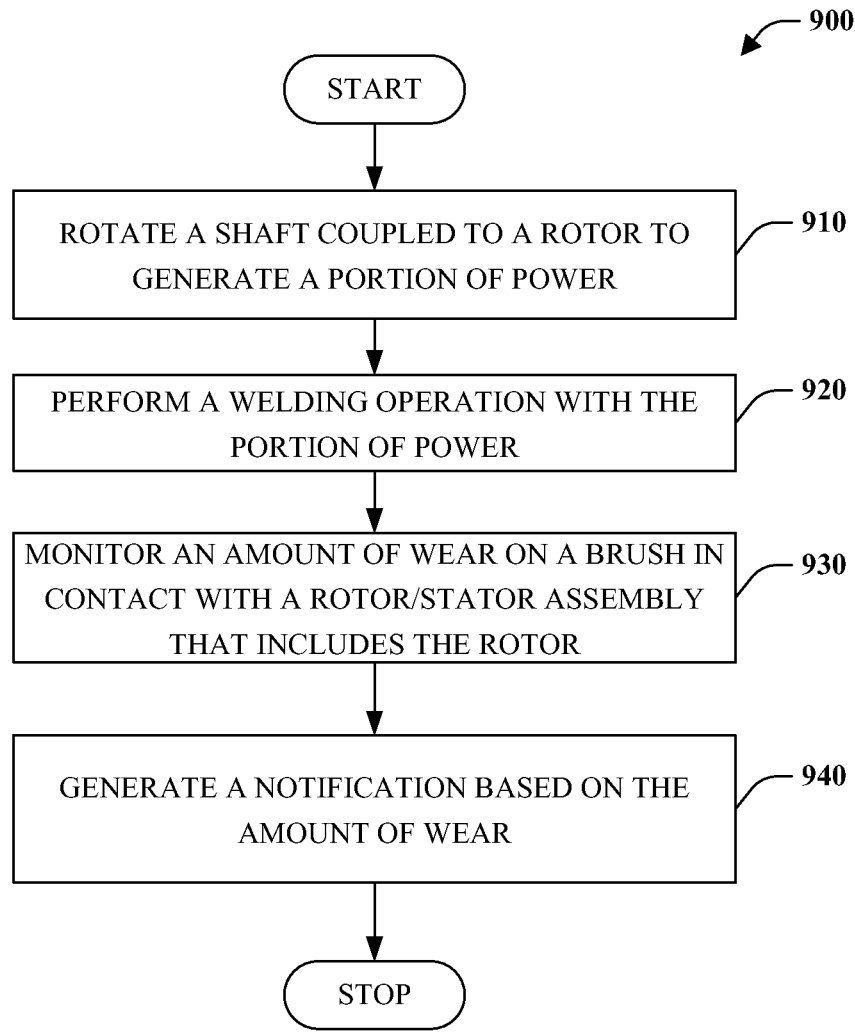
FIG. 9 is a flow diagram of monitoring an amount of wear on a brush associated with a rotor/stator assembly in an engine driven welding device.

FIG. 8A illustrates brush monitoring system 800 that can be retrofitted to an engine driven welding device. System 800 includes metal shim 802 affixed to brush 610, wherein metal shim 802 is affixed lengthwise on brush 610 and parallel to the direction of wear indicated in FIG. 8A. In particular, metal shim 802 can have a length, width, and thickness and brush can include a length, width, and a thickness. The length of metal shim 802 can be affixed and parallel to a length of brush 610. Upon an amount of wear, physical contact between rotor/stator assembly 606 and metal shim 802 can produce an audible sound based on the composition of metal shim and the composition of the contact area on the portion of the rotor/stator assembly 606. For instance, a metal on metal can produce a screech sound upon contact and/or rubbing. In another example, metal shim 802 can be embedded or incorporated within brush 610. It is to be appreciated that the length overlap of metal shim 802 on brush 610 and associated length can determine an amount of wear tolerated or desired (e.g., less metal shim overlap corresponds to more brush wear and more metal shim overlap corresponds to less brush wear).

Figure 8B:
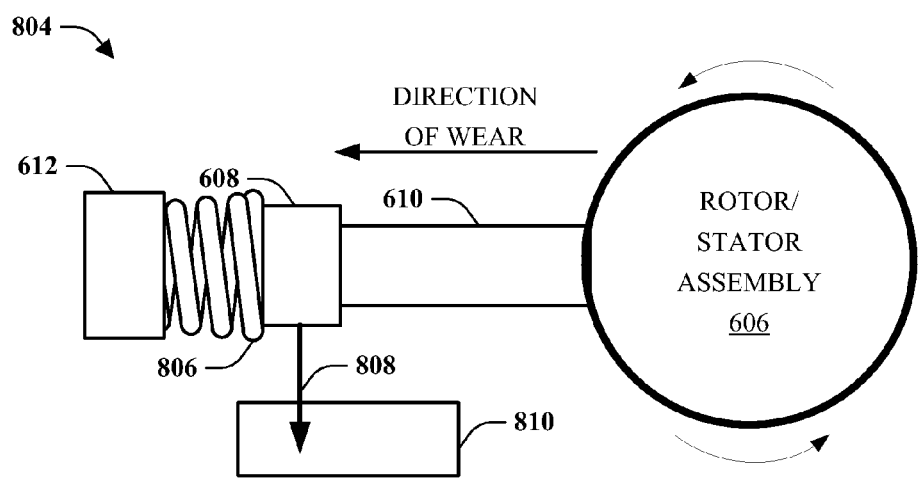
FIG. 8B is a diagram illustrating a rotor/stator assembly with a brush monitoring system that is can be retrofitted to an engine driven welder.

FIG. 8B illustrates brush monitoring system 804 that can be retrofitted to an engine driven welding device. System 802 includes spring 806 that forces brush 610 to be in physical contact with a portion of rotor/stator assembly 606. It is to be appreciated that spring 806 can be in-between bracket 612 and brush assembly 608 (as depicted) or in-between brush 610 and brush assembly 608. Indicator 808 can correspond to gauge 810 that depicts an amount of wear on brush 610. As depicted, indicator 808 can be affixed to brush assembly 608.

However, in another embodiment, indicator 808 can be affixed and stationary on brush 610.

As brush 610 wears in the direction of wear, indicator 808 moves on gauge 810 providing illustration of an amount of wear. Gauge 810 can include a graphic, a color, a number, a range of numbers, a letter, words, symbols, and the like. For instance, gauge 810 can include a green colored portion and a red colored portion, wherein indicator 808 in green portion is representative of brush wear within desired settings for wear and indicator 808 in red portion is representative of brush wear outside desired settings for wear. In other words, green can relate to brush 610 as usable and red can relate to brush 610 needing maintenance, service, and/or replacement.

By way of example and not limitation, gauge 810 can be viewable in a transparent portion of a housing for a welding device. For instance, a casing or housing can surround internals of an engine driven welder and such casing or housing can include a transparent portion that allows view of gauge 810. Moreover, it is to be appreciated that gauge 810 can be an example of a non-electrical notification component 510. Gauge 810 and indicator 808 can be chosen with sound engineering judgment without departing from the subject innovation. For example, a wheel gauge can be utilized in which a portion of the wheel is viewable via the transparent portion of the casing or housing which indicates a wear of brush 610.

In an embodiment, a welding device can include an electrical circuit that is associated with the brush, wherein the wear of the brush is indicated by at least one of a completion of the electrical circuit or a break of the electrical circuit. In the embodiment, the electrical circuit is embedded within the brush. In the embodiment, the electrical circuit is affixed parallel to a direction in which the brush is worn by contact with the commutator. In the embodiment, the completion of the electrical circuit a portion of current that flows from a controller through a wire associated with the brush through the commutator back to the controller. In the embodiment, the break of the electrical circuit is a disruption of a portion of current that flows from a controller through a wire associated with the brush back to the controller.

In an embodiment, a welding device can include: a controller that is configured to generate a portion of electrical current for the electrical circuit; and the notification component delivers the alert based on the controller. In an embodiment, a welding device can include a metal shim that is affixed parallel to a direction in which the brush is worn by contact with the commutator. In the embodiment, the metal shim generates an audible alert when in contact with the commutator. In an embodiment, a welding device can include a member affixed to at least one of a brush or a portion of an assembly for the brush that provides a visual indication of the wear of the brush. In the embodiment, the visual indication is a gauge that includes a letter, a number, a symbol, or a color. In the embodiment, the alert is at least one of a light, an audible sound, a haptic output, a portion of text, or a termination of the electrical current.

In an embodiment, a welding device can include: an energy storage device that is configured to store the portion of electrical current; and a switch component that selects between the portion of the electrical current that is stored with the energy storage device or the portion of the electrical current that is generated by the rotation of the rotor. In an embodiment, a welding device can include: a controller that collects a resistance from the brush during rotation of the rotor at an interval of time; the controller ascertains the wear of the brush based upon the resistance collected at two or more intervals of time; and the notification component delivers the alert based upon the resistance collected at two or more intervals of time. In an embodiment, a welding device can include a transparent portion on a housing of the welding device, wherein the alert is visible via the transparent portion.

In an embodiment, the welding system can include a notification that is at least one of a light, an LED light, a sound, a display of text, a graphical display, or a haptic output. In the embodiment, the member is integrated with an electrical circuit. In an embodiment, the welding system can include: a transparent portion on a housing of the welding system; a spring coupled to a brush assembly that forces the brush in contact with the portion of the rotor/stator assembly; an indicator affixed to the brush assembly, wherein the indicator is visible through the transparent portion on the housing; and the indicator depicts visual indication of the wear of the brush on a gauge.

In view of the exemplary devices and elements described supra, methodologies that may be implemented in accordance with the disclosed subject matter will be better appreciated with reference to the flow charts and/or methodologies of FIG. 9. The methodologies and/or flow diagrams are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods and/or flow diagrams described hereinafter.

Sequentially, the following occurs as illustrated in the decision tree flow diagram 900 of FIG. 9 which is flow diagram 900 that monitors a wear of a brush in contact with a portion of a rotor/stator assembly of an engine driven welding device. A shaft coupled to a rotor is rotated to generate a portion of electric power (reference block 910). A welding operation is performed with the portion of electric power (reference block 920). An amount of wear on a brush is monitored while in contact with a rotor/stator assembly that includes the rotor (reference block 930). A notification is generated based on the amount of wear of the brush (reference block 940).

While the embodiments discussed herein have been related to the systems and methods discussed above, these embodiments are intended to be exemplary and are not intended to limit the applicability of these embodiments to only those discussions set forth herein. The control systems and methodologies discussed herein are equally applicable to, and can be utilized in, systems and methods related to arc welding, laser welding, brazing, soldering, plasma cutting, waterjet cutting, laser cutting, and any other systems or methods using similar control methodology, without departing from the spirit or scope of the above discussed inventions. The embodiments and discussions herein can be readily incorporated into any of these systems and methodologies by those of skill in the art. By way of example and not limitation, a power supply as used herein (e.g., welding power supply, among others) can be a power supply for a device that performs welding, arc welding, laser welding, brazing, soldering, plasma cutting, waterjet cutting, laser cutting, among others. Thus, one of sound engineering and judgment can choose power supplies other than a welding power supply departing from the intended scope of coverage of the embodiments of the subject invention.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A welding system, comprising:
   an engine that rotates a shaft coupled to a rotor/stator assembly;
   a brush in contact with a portion of the rotor/stator assembly;
   a member that is in contact with the brush parallel with a direction of wear of the brush;
   a controller that activates a notification based on the member coming in physical contact with the rotor/stator assembly;
   a transparent portion on a housing of the welding system;
   a spring coupled to a brush assembly that forces the brush in contact with the portion of the rotor/stator assembly;
   an indicator affixed to the brush assembly, wherein the indicator is visible through the transparent portion on the housing; and
   wherein the indicator depicts visual indication of the wear of the brush on a gauge;
   a controller in communication with the brush, wherein the controller calculates a resistance of the brush to determine an amount of wear for the brush, wherein the controller includes a notification component and communicates an alert to the notification component based on the calculated amount of wear, wherein the controller periodically collects a resistance level for the brush to estimate the amount of wear and graphically represent the amount of wear at the notification component.

2. The welding system of claim 1, wherein the notification is a light, an LED light, a sound, a display of text, a graphical display, or a haptic output.

3. The welding system of claim 1, wherein the member that comes in physical contact with the rotor/stator assembly is integrated with an electrical circuit.

4. A welding system, comprising:
   a housing that encloses an engine that rotates a shaft coupled to a rotor/stator assembly;
   a brush assembly that houses a first brush and a second brush that are in contract contact with a portion of the rotor/stator assembly;
   a spring coupled to the brush assembly that forces the first brush and the second brush in contact with the portion of the rotor/stator assembly;
   a transparent portion on a housing of the welding system, an indicator affixed to the brush assembly, wherein the indicator is visible through the transparent portion on the housing; and
   the indicator depicts a visual indication of the wear of the first brush and the second brush on a gauge;
   a controller in communication with the brush, wherein the controller calculates a resistance of the brush to determine an amount of wear for the brush, wherein the controller includes a notification component and communicates an alert to the notification component based on the calculated amount of wear, wherein the controller periodically collects a resistance level for the brush to estimate the amount of wear and graphically represent the amount of wear at the notification component.

5. A welding device, comprising:
   a motor-driven welder assembly including an engine that is configured to rotate a shaft;
   a rotor having at least one electromagnet, the rotor is coupled to the shaft;
   a stator, having at least one electromagnet, that houses the rotor, wherein a rotation from the shaft rotates the rotor to generate a portion of electrical current;
   the portion of electrical current is used as a power source for the welding device to perform a welding operation;
   a brush that contacts a commutator, wherein the commutator is coupled to an axle of the rotor; and
   a controller in communication with the brush, wherein the controller calculates a resistance of the brush to determine an amount of wear for the brush, wherein the controller includes a notification component and communicates an alert to the notification component based on the calculated amount of wear, wherein the controller periodically collects a resistance level for the brush to estimate the amount of wear and graphically represent the amount of wear at the notification component;
   an indicator affixed to the brush assembly; and wherein the indicator depicts visual indication of the wear of the brush on a gauge.

* * * * *